United States Patent [19]

Cenanovic

[11] Patent Number: 4,635,840
[45] Date of Patent: Jan. 13, 1987

[54] FORMING METHOD USING AN ELECTROMAGNETICALLY EXPLODED FILAMENT

[76] Inventor: Matija Cenanovic, 2567 Annelyn Court, Mississauga, Ontario, Canada, L5C 2Z7

[21] Appl. No.: 573,661

[22] Filed: Jan. 25, 1984

Related U.S. Application Data

[63] Continuation-in-part of Ser. No. 422,662, Sep. 24, 1982, abandoned, which is a continuation of Ser. No. 166,064, Jul. 7, 1980, abandoned.

[51] Int. Cl.$^4$ ............................................. B23K 20/08
[52] U.S. Cl. .................................... 228/107; 228/2.5; 29/421 E; 72/56
[58] Field of Search ............... 228/2.5, 107, 108, 109; 29/421 R, 421 E; 72/56, 706; 219/146

[56] References Cited

U.S. PATENT DOCUMENTS

| | | | |
|---|---|---|---|
| 3,045,339 | 7/1962 | Callahan | 29/421 |
| 3,131,467 | 5/1964 | Thaller et al. | 72/56 |
| 3,140,537 | 7/1964 | Popoff . | |
| 3,203,212 | 8/1965 | Gimicich | 72/56 |
| 3,208,254 | 9/1965 | Inoue | 219/149 X |
| 3,224,734 | 12/1965 | Hill | 254/134.6 |
| 3,434,194 | 3/1969 | Whitaker et al. | 29/421 |
| 3,583,062 | 6/1971 | Sharp et al. | 228/108 |
| 3,654,788 | 4/1972 | Kimura | 72/56 |
| 3,710,434 | 1/1973 | Daniels et al. | 228/107 X |
| 3,781,966 | 1/1974 | Lieberman | 29/42 X |
| 3,863,327 | 2/1975 | Legate et al. | 228/107 |
| 3,910,478 | 10/1975 | Howell et al. | 228/2.5 |
| 3,939,681 | 2/1976 | Yoshitomi et al. | 72/56 |
| 4,028,789 | 6/1977 | Loch | 29/421 G X |
| 4,030,419 | 6/1977 | Loch | 29/421 E X |
| 4,057,187 | 11/1977 | Cranston et al. | 228/107 |
| 4,069,573 | 1/1978 | Rogers, Jr. et al. . | |

FOREIGN PATENT DOCUMENTS

| | | | |
|---|---|---|---|
| 1806283 | 10/1969 | Fed. Rep. of Germany . | |
| 1911424 | 9/1970 | Fed. Rep. of Germany . | |
| 36425 | 11/1975 | Japan | 228/107 |
| 39296 | 10/1980 | Japan | 228/107 |
| 515757 | 11/1968 | Switzerland . | |

OTHER PUBLICATIONS

Industrie Anzeiger, vol. 97, No. 24, Mar. 21, 1975, L. Rafailoff et al.
"Drahtexplosionen und ihre Anwendung zum Fügen von Rohren mit kleinem-Innendurchmesser in Bohrungen" pp. 449 to 452.
Alston, *High Voltage Technology*, Oxford University Press, 1968, pp. 130–131.
Woodson et al., Electromechanical Dynamics Part II, John Wiley & Sons, Inc., 1968, pp. 428–432.
*Welding Kaiser Aluminum*, First Addition, Kaiser Center, California, 1961, pp. 18-8-18-13.
Berger, T. I. *Effects of Surrounding Medium on the Performance of Exploding Aluminum Foil Fuse*, 2nd IEEE International Pulsed Power Conference, Texas 1979, p. 237.
Budovich et al., *Calculation of the Voltage Impulse in Electric Explosion of Conductors*, Electrichestro, No. 1, 1975.
Vlastos, A. E., Current Pause in Exploding Wire Discharges, *Journal of Applied Physics*, 38, No. 13, 1967, p. 4993.
Fermemon et al., Electrical Breakdown in Water in the Microsecond Regime, 2nd IEEE International Pulsed Power, TX 1979, p. 422.

*Primary Examiner*—M. Jordan
*Attorney, Agent, or Firm*—Ridout & Maybee

[57] ABSTRACT

The invention provides a method for expanding a pipe at a predetermined location therealong by positioning a conductive wire at the required location and rapidly discharging a known electrical charge through the wire to explode, thereby initiating a shock wave of known energy which expands the pipe plastically by a controlled amount. As applied to the repair of a pipe at a normally inaccessible location, a plastically deformable metallic sleeve capable of being cold welded to the pipe is positioned at the required location, and a conductive wire is exploded electromagnetically within the sleeve to expand the sleeve into cold welding relation with the pipe.

15 Claims, 15 Drawing Figures

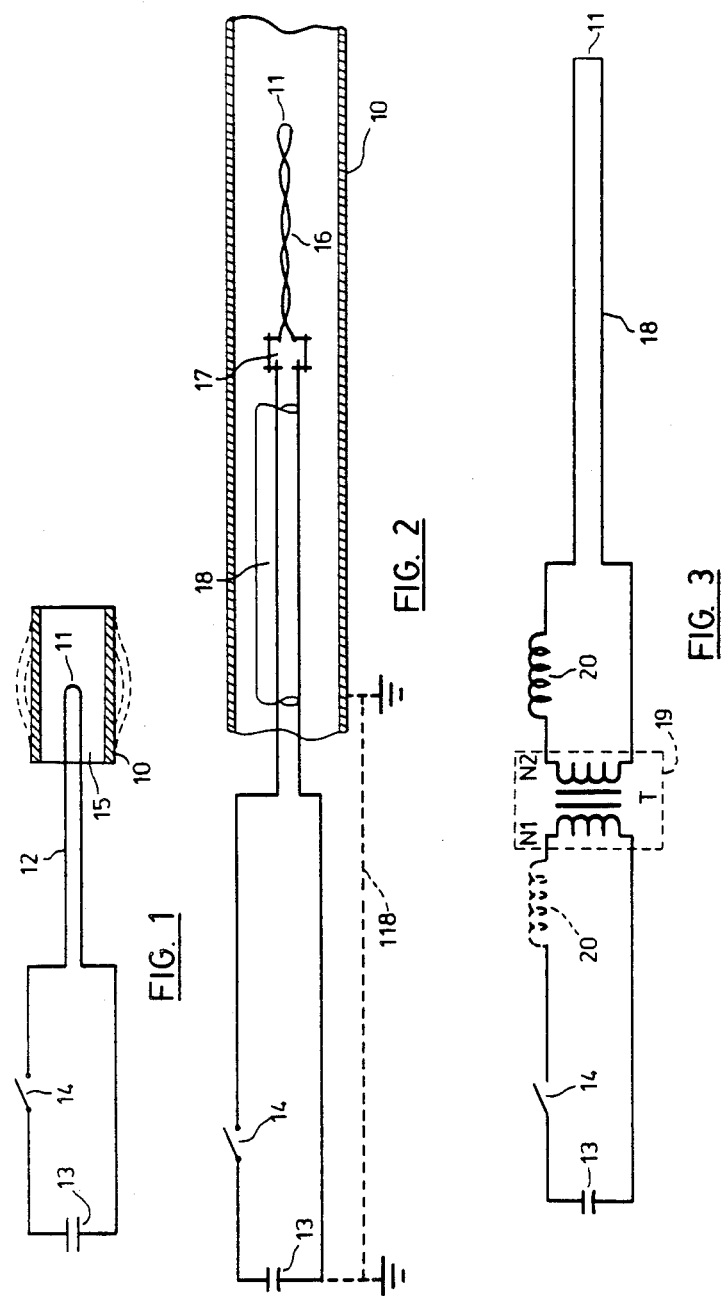

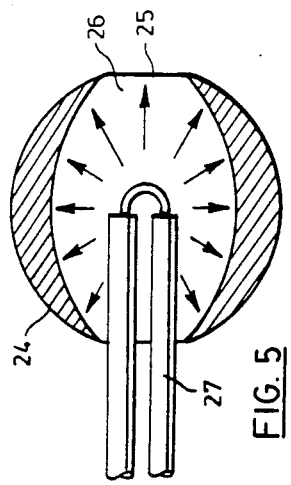
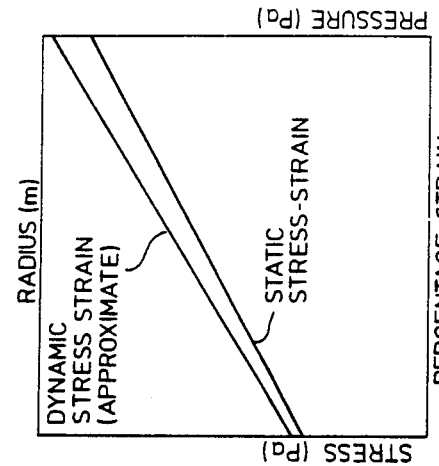
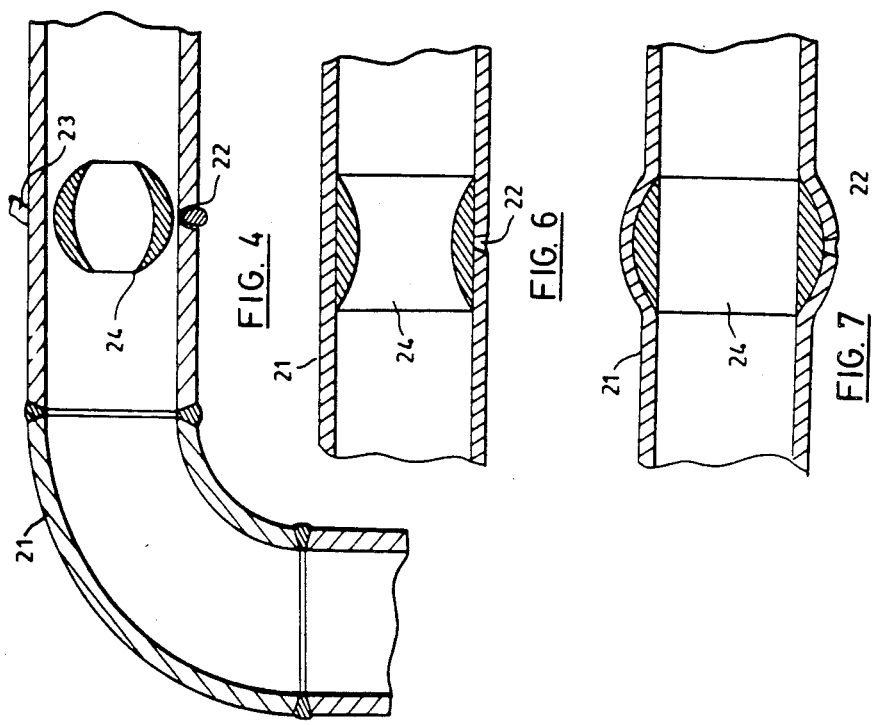

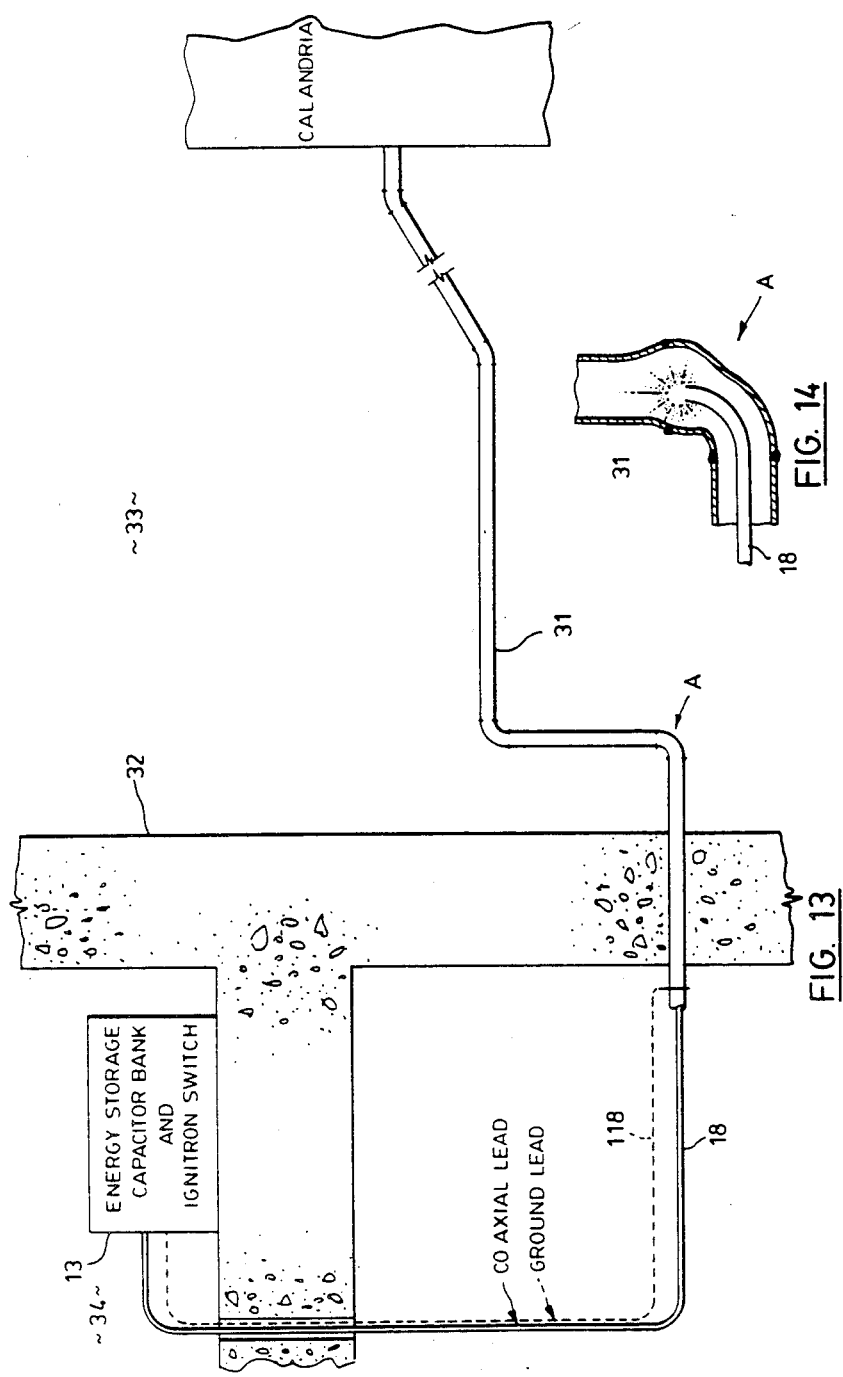

FORMING METHOD USING AN ELECTROMAGNETICALLY EXPLODED FILAMENT

CROSS REFERENCE TO RELATED APPLICATIONS

This invention is a continuation-in-part of my copending application Ser. No. 422,662 filed on Sept. 24, 1982, which is a continuation of my application Ser. No. 166,064 filed on July 7, 1980 and now abandoned.

FIELD OF THE INVENTION

This invention relates generally to techniques for repairing pipes, by patching or plugging, more particularly at locations therealong which are not readily accessible for repair by known techniques.

BACKGROUND OF THE INVENTION

In a water-moderated nuclear reactor, for example, the moderator pipes are subjected to vibration-induced mechanical wear at specific locations at which hangers are located. In the course of time the wall of a pipe becomes worn resulting in leakage which calls for prompt attention. However, if the defect occurs within the reactor vault, as is likely to be the case, it is not readily accessible as it is encased within concrete shielding and, furthermore, is within a highly radioactive region.

In certain cases it would be possible to isolate a leaky pipe by inserting a plug, but the difficulty would be to feed the plug along the pipe past its various bends which would normally prevent its passage. In order to plug a pipe it is generally necessary to expand the pipe at certain locations, such as elbows, to permit passage of the plug. If the particular location is not accessible from outside the pipe, such expansion must be effected from inside the pipe and must be effected without rupturing or weakening the pipe.

SUMMARY OF THE INVENTION

This can be accomplished, according to one aspect of the present invention, which provides a method of expanding a pipe by a controlled amount at a predetermined location at an exteriorly inaccessible, predetermined location therealong; using an electromagnetic explosion technique. In this method a conductive filament is positioned concentrically within the pipe at the required location, the filament being immersed in an energy transfer medium filling the space between the filament and the tubular member, and a predetermined electrical charge is rapidly discharged through the filament to explode the filament, thereby to initiate a shock wave of predetermined energy, the shock wave being transmitted through the medium to impinge on the inside surface of the tubular member thereby to expand the member plastically by said controlled amount. The dimensions of the filament are necessarily small in relation to the internal diameter of the pipe; that is to say, the filament occupies a volume whose maximum dimension is not more than about one-eighth the internal diameter of the pipe.

Typically, the electrical charge is derived from a capacitor of known capacitance charged to a known voltage, and conducted along a shielded cable extending along the tubular member. The energy of the discharge, and therefore the energy of the shock wave, can thus be controlled so as to achieve the required amount of plastic expansion of the tubular member having regard to its known metallurgical properties. The energy transfer medium may be a non-explosive liquid, such as water normally present in the pipe, or it may be a non-explosive water-soluble solid or gel. Suitable water-soluble polymers include polyvinyl alcohol, methyl cellulose and polyacrylic acid. DL Hand Cleaner was also found suitable.

Instead of plugging a pipe it may be preferable to patch or line it at the location at which the pipe has become worn, or is expected to become worn. To this end, according to another aspect of the invention there is provided a method of lining the internal surface of a pipe at a predetermined location therealong using a plastically deformable metallic tubular insert and an electromagnetic explosion technique for expanding the insert so that the insert becomes cold welded to said internal surface. The method comprises positioning the insert within the pipe at the required location, positioning a conductive filament concentrically within the insert, the space between the filament and the insert being filled with an energy transfer medium, and rapidly discharging a predetermined electrical charge through the filament to explode the filament thereby to initiate a shock wave of predetermined energy. The shock wave is transmitted through the medium to impinge on the insert thereby to expand the insert plastically into cold welding relation with the internal surface of the pipe.

The dimensions of the filament are again small in relation to the internal diameter of the tubular insert such that the shock wave has a substantially spherical wave front; that is, the filament occupies a volume whose maximum dimension is not more than about one-eighth the internal diameter of the insert. The interior and exterior surfaces of the insert are preferably surfaces of revolution, the exterior surface being ellipsoidal, and the wall thickness of the insert (i.e. the mass profile) tapering symmetrically towards its ends. The exterior surface should be configured so that the angle of impact at each point at which said exterior surface impinges on the internal surface of the pipe lies within the range at which cold welding can take place, typically from 2°–7°.

BRIEF DESCRIPTION OF THE DRAWINGS

Exemplary methods of carrying the invention into effect will now be described with reference to the accompanying drawings, in which:

FIG. 1 is a schematic diagram of an apparatus used to expand a pipe at a predetermined location;

FIG. 2 illustrates one practical form of the apparatus;

FIG. 3 illustrates an alternative form of the apparatus;

FIGS. 4 and 5 are diagrammatic representations of a tubular insert used to patch or line the internal surface of a pipe to repair a leak;

FIG. 6 shows in section one typical repair to a leaky pipe;

FIG. 7 shows in section another repair to a leaky pipe;

FIG. 9 is a stress-strain diagram illustrating properties of the patch material;

FIG. 13 shows in section part of a reactor vault to which the method of the invention is applied; and FIG. 14 is an enlarged sectional view of part of the moderator pipe shown in FIG. 13.

DESCRIPTION OF THE PREFERRED EMBODIMENTS

Figure 8:
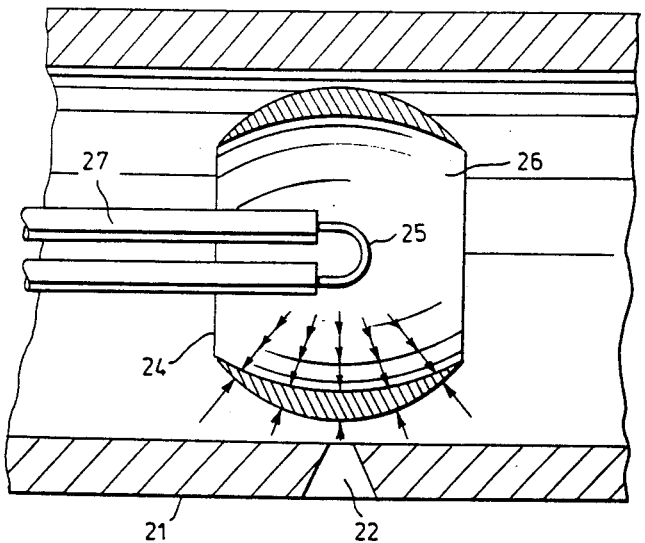
FIG. 8 shows a detail of a self-contained package for patching a leaky pipe.

Referring to FIG. 1, there is shown an apparatus for expanding a selected region of a pipe 10, which may be a moderator pipe of a water-moderated nuclear reactor. In this instance it is required to isolate the pipe, which may be leaking, by inserting a plug at the appropriate location. This might be accomplished quite easily by known techniques were it possible to insert the plug along the pipe to the required location, but in practice there are numerous bends in the pipe which would obstruct the passage of a plug of suitable diameter.

To permit the passage of such a plug it is necessary to expand the pipe at certain locations. Furthermore, it is most important to control the amount of expansion. This is accomplished, according to the present invention, by exploding a conductive filament within the pipe to create a shock wave having a predetermined amount of energy. As shown in FIG. 1, the filament 11 is positioned concentrically within the pipe 10 at the required location, being connected via a flexible shielded coaxial or twin cable 12 to a charged capacitor 13. The capacitor, being of known capacitance and being charged to a known voltage, stores an amount of energy corresponding to the required energy of the shock wave. When the switch 14 is closed, the capacitor is rapidly discharged through the filament 11 causing it to explode. In order to establish the shock wave, of course, it is necessary that the appropriate region of the pipe 10 should be filled with a suitable energy transfer medium 15, which may be water normally present in the pipe, or another medium such a non-explosive solid or gel. The shock wave of known energy is transmitted by the medium to impinge on the inner surface of the pipe causing it to expand plastically, the energy and its rate of discharge having been selected so that the force exerted on the pipe will exceed the yield strength of the metal of the pipe by an amount just sufficient to give the required expansion.

The exploding wire process is inherently different from a spark discharge process, and is far more effective because the energy of the discharge can be released at a much higher rate. The explosion mechanism is rather complex, involving magnetohydrodynamic compression combined with thermal expansion and evaporation of the filament. Typically a 100 kA current pulse passing through a copper wire of 1 mm diameter creates a magnetic flux density at the surface of the wire of about 40 Tesla. The resulting compression, or pinch, is greater than 600 MPa (6000 atmospheres) and counteracts expansion pressures caused by heating, melting and vaporization. This condition is highly unstable and results in an explosion with instant release of the accumulated energy, causing a pressure wave with an extremely steep front. The electrical discharge which follows the explosion of the wire creates another pressure wave, but this plays no part in the process as it is of smaller amplitude and longer duration.

The efficiency of the exploding filament technique of the present invention therefore depends upon the ability to achieve maximum energy accumulation at the centre of the explosion before the explosion takes place. The condition can be optimized by appropriate selection of wire diameter and current pulse shape. Ideally, to achieve a shock wave having a spherical wave front the wire or filament should be small enough to behave as a point charge, and this can be accomplished by making the dimensions of the wire small in relation to the diameter of the pipe. Preferably, the wire occupies a volume whose maximum dimension is not more than about one-eighth the internal diameter of the pipe. Because the initial pressure wave is of very short duration it is not necessary to contain the energy transfer medium in a closed system.

A practical form of the apparatus described above is illustrated in FIG. 2. The pipe 10 to be expanded is of stainless steel and about 4 cm diameter. The filament 11 is a copper wire, No. 14 gauge, 1.6 mm in diameter and 10 mm long. Means (not shown) are provided for positioning the filament concentrically within the pipe at the required location. The filament 11 is connected by a pair of leads 16 (Wire No. 6 AWG type) and a bus interface 17 to a long coaxial cable 18 extending within the pipe. The cable 18 is shielded, being 15 kV XLPE concentric neutral cable. The far end of the cable is connected via a switch 14 to a capacitor 13. The capacitor has a capacitance of 1200 $\mu f$ and is charged to 10 kV, the stored energy therefore being 60 kJ. The switch is an ignitron, suitable switches being the ignitron types GL 8205 and GL 7703 supplied by General Electric Company. The addition of an optional separate ground cable 118, extending from the capacitor 13 to the pipe 10 to be expanded, is beneficial, though not essential, to prevent rise of ground potential of the metal pipe and any connected metal structure.

As illustrated in FIG. 3, the electrical circuit may include further elements for controlling or modifying the electrical discharge. As before a capacitor 13 of known capacitance and charged to a known voltage is discharged by operation of an ignitron switch 14. The resultant current pulse is transmitted by a cable 18 to the filament 11, which is selected to be of the appropriate diameter, shape, volume and configuration to control the energy release, having regard to the amount of energy to be released and the shape of the current pulse. To control the shape of the current pulse the circuit includes a pulse transformer 19, and/or one or more series inductors 20.

The exploding wire technique used to expand a pipe at a given location can equally well be used to expand a tubular insert or sleeve within a pipe for the purpose of repairing a leak directly. This repair technique is illustrated diagrammatically in FIGS. 4 to 7, which show a stainless steel pipe 21 having a hole 22 to be repaired. The hole 22 may have been worn mechanically at the location of a hanger 23 as a result of mechanical vibration over a period of time. Basically the method comprises locating a sleeve 24 within the pipe at the required location, and exploding a filament positioned centrally within the sleeve so as to expand the sleeve in cold welding relation with the inner surface of the pipe to seal the leak. FIG. 4 shows the sleeve 24 located in the region of the hole 22. In this example the pipe is of stainless steel having an internal diameter of approximately 6 cms, and the sleeve is of a plastically deformable metal capable of being cold welded to the metal of the pipe, such as aluminum, aluminum alloy or stainless steel. The outside diameter of the sleeve is slightly less than the internal diameter of the pipe. Ideally, in order that the sleeve can be inserted along the pipe past numerous bends the sleeve should be spherical, but in any case the outer surface of the sleeve should be a surface of revolution and preferably ellipsoidal. In the present example the interior surface of the sleeve is also ellipsoidal, being coaxial with the exterior surface, and is configured so that the wall thickness of the sleeve tapers symmetrically towards its ends.

As shown in FIG. 5, a conductive filament 25 is located concentrically within the sleeve 24, being immersed in an energy transfer medium, such as a water-soluble polymer or polymer soap 26, which fills the interior of the sleeve. The filament, whose dimensions are small in relation to the internal diameter of the sleeve, is a copper wire substantially the same as the wire 11 shown in FIG. 2. By means of an electrical circuit as shown in FIG. 2 or FIG. 3, to which the filament is connected by a shielded twin cable 27, a predetermined electrical charge is rapidly discharged through the filament, exploding the filament to initiate a substantially spherical shock wave of predetermined energy. The shock wave is transmitted by the medium 26 to impinge on the inner surface of the sleeve, causing the sleeve to expand. As the sleeve expands it strikes the inner surface of the pipe 21, each point on the outer surface of the sleeve meeting the pipe surface at an angle of impact such that cold welding between the two metals can take place. With the configuration of sleeve shown, the energy of the explosion can be controlled so as to cause the exterior surface of the sleeve to become cylindrical, as in FIG. 6, with substantially no plastic deformation of the pipe 21, or to cause the interior surface of the pipe to become cylindrical and flush with the interior surface of the pipe, as shown in FIG. 7.

The water-soluble energy transfer medium is subsequently washed away. Alternatively, instead of using a solid or gel as the energy transfer medium, one may use water that is normally present in the pipe, the filament being located within the sleeve mechanically by a spider.

In order to obtain the best results, attention must be paid to the design of the sleeve 24, as this element must not only be expanded by the required amount but must also engage the internal surface of the pipe 21 so that each point of its surface has the required velocity and makes the required angle of impact to effect a cold weld. The following considerations should be taken into account, reference being made to the diagrams of FIGS. 8 and 9. For simplicity it is assumed that the sleeve is substantially spherical.

The angle of impact between a hollow spherical metallic sleeve 24 and the inner wall of a leaky pipe 21 should be kept between 2°-7° to obtain an intimate bond. This angle can be easily controlled by varying the shape of the inner surface of the sleeve and consequently changing the wall thickness and the mass profile of the sleeve, as shown in FIG. 8. Radial expansion of the sleeve wall during the electromagnetically created pressure wave pulse is governed by dynamic balance of stresses on any sleeve segment thus:

$$P_{wave\ pulse} = P_{inertia} + P_{plastic} \quad (1)$$

In this analysis the effect of the air resistance is neglected. The pressure necessary to overcome the inertia of the sleeve wall is $$P_{inertia} = wd\frac{d^2r}{dt^2} \quad (2)$$

where
w = the wall thickness
d = the density of the sleeve material.

The pressure necessary to deform the sleeve plastically can be obtained from the approximate dynamic stress-strain diagram for the sleeve material, s(e) shown in FIG. 9.

$$s(e) = s_y + \left(\frac{s_t - s_y}{e_t}\right) e \quad (3)$$

This relationship can be transformed to express the pressure, by using the following equations $$P = s\frac{w}{R} \quad (4)$$

$$e = \frac{r}{R} \quad (5)$$

Hence

Hence $$P_{plastic}(r) = \underbrace{s_y\frac{w}{R}}_{P} + \underbrace{\frac{w}{R}\left(\frac{s_t - s_y}{e_t}\right)}_{Q} \cdot r \quad (6)$$

or $$P_{plastic}(r) = P_y + Q \cdot r \quad (7)$$

By annealing the sleeve, the pressure necessary to achieve plastic deformation can be reduced. The pressure pulse waveform can be controlled by the selection of the exploding wire diameter and the impulse current waveform, thus influencing the strain rate and changing the dynamic stress-strain relationship. The velocities $v_A$ and $v_B$, of the two segments at locations A and B, of the sleeve as shown in FIG. 8, can be calculated from equation (1). For simplicity the applied pressure wave pulse is assumed to be uniform.

$$w_A d\frac{d^2r_A(t)}{dt^2} + P_{yA} + Q_A \cdot r_A(t) = w_B d\frac{d^2r_B(t)}{dt^2} + P_{yB} + Q_B r_B(t) \quad (8)$$

or $$w_A d\frac{dv_A(t)}{dt} + P_{yA} + Q_A \cdot r_A(t) = w_B \cdot d\frac{dv_B(t)}{dt} + P_{yB} + Q_B r_B(t) \quad (9)$$

Thus, the critical angle of impact can be controlled by controlling the local velocity of each segment, which in turn is a function of the wall thickness of the segment. Further control of the angle of impact can be achieved by varying the local density of the energy transfer medium, for example by using two or more water-soluble polymers appropriately located within the sleeve.

Figure 10:
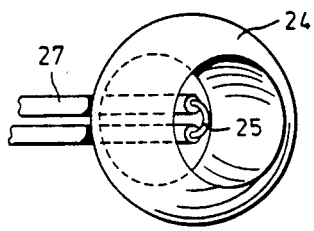
FIGS. 10 and 11 show two alternative forms of the repair package.
Figure 11:
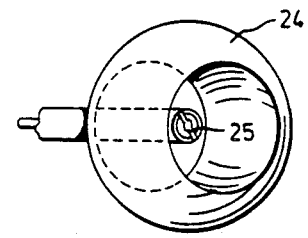

FIG. 10 shows a spherically shaped sleeve 24 having a centrally positioned filament 25 to which the current pulse is supplied via twin cables 27. FIG. 11 shows a similar sleeve 24 having a centrally positioned filament 25 to which the current pulse is supplied via a coaxial cable. More than one filament may be employed.

Figure 12A:
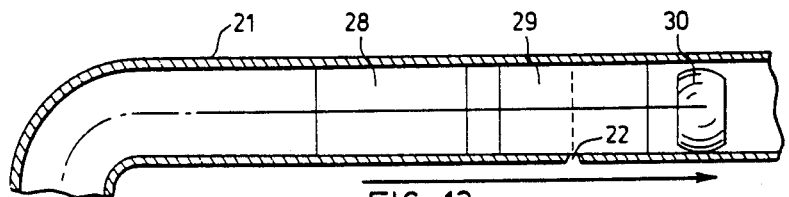
FIGS. 12a and 12b illustrate diagrammatically a method of locating a hole in a pipe and positioning a patch at the required location.
Figure 12B:
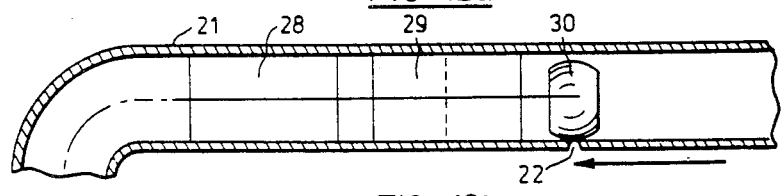

In order to employ the method described above it is of course necessary first to locate the region of the pipe to be repaired and then to move the sleeve and the exploding filament to the required location. This is accomplished using known devices. Ultrasonic detectors for locating the position of a defect such as a hole in a pipe are known in the art. Also, devices capable of travelling along the interior of a pipe to carry other equipment therealong are known. Using these devices, an ultrasonic locating probe and a mechanical mover, connected in train with a patch package, i.e. a repair sleeve and explosive filament, it is a simple matter to position the patch package at the required location. As illustrated in FIGS. 12a and 12b, this is done by advancing the train consisting of the mechanical mover 28, locating probe 29, and patch package 30 along the interior of the pipe 21 until the hole 22 is located by the locating probe 29, as shown in FIG. 12a. At this position the patch package 30 is positioned at a known distance beyond the hole 22. The mechanical mover is therefore reversed and caused to travel through the same distance, thereby bringing the patch package to the position of the hole as shown in FIG. 12b.

The locating probe is essentially an ultrasonic transducer whose parameters are chosen to suit the inside diameter of the pipe in question. For example, for a pipe having an inside diameter of 1.5 inches, a suitable transducer would have an operating frequency of 5 MHz and a diameter of 0.25 inch focussed to 0.75 inch in water. Such transducers are manufactured by Megasonic Inc. of Edina, Mn. The mechanical mover may be of the type described in "Electrical World", May 1, 1979 issue, at page 80, or it may be of the type described in U.S. Pat. No. 3,224,734, dated Dec. 1, 1965 to J. D. Hill and entitled "Pneumatic Self-Propelled Apparatus". Alternatively, it is possible in some cases to move the manually.

FIG. 13 shows part of the structure of a water-moderated nuclear reactor containing a moderator pipe 31 wherein it is necessary to expand the pipe at the region A. This part ot the pipe is shown in section in FIG. 14. A concrete wall 32 separates a high radiation zone 33 of the reactor from the low radiation zone 34, the pipe 31 extending through the wall. The region A of the pipe 31 is accessible only from the inside. Thus, the coaxial cable 18 from the capacitor 13 is inserted into the pipe from the low radiation zone 34 to the required location. The ground lead 118 is shown dotted.

What I claim is:

1. The method of expanding a metal pipe by a controlled amount at an exteriorly inaccessible, predetermined location therealong, which comprises positioning a conductive filament concentrically within the pipe at said predetermined location, the filament being immersed in an energy transfer medium filling the space between the filament and the pipe, and rapidly discharging a predetermined electrical charge through the filament to explode the filament, the explosion of the filament creating a shock wave of predetermined energy that is transmitted through the medium to impinge on said pipe thereby to expand the pipe plastically, the predetermined energy of said shock wave created by the exploding filament being controlled so as to limit the amount of expansion of the pipe without the need for exterior constraints, wherein the dimensions of the filament are small in relation to the diameter of the pipe such that the shock wave has a substantially spherical wave front, the filament occupying a volume whose maximum dimension is not more than about one-eighth the internal diameter of the pipe.

2. A method according to claim 1, wherein the energy transfer medium is non-explosive liquid normally present in the tubular member.

3. A method according to claim 1, wherein the energy transfer medium is a non-explosive water-soluble solid or gel.

4. The method of lining the internal surface of a pipe at a predetermined location therealong, which comprises positioning a metallic sleeve within the pipe at said predetermined location, the interior and exterior surfaces of said sleeve being coaxial surfaces of revolution with the exterior surface being ellipsoidal, positioning a conductive filament concentrically within the metal sleeve, the space between the filament and the sleeve being filled with an energy transfer medium, and rapidly discharging a predetermined electrical charge through said filament to explode the filament, thereby to initiate a shock wave of predetermined energy, the shock wave being transmitted through the medium to impinge upon said sleeve thereby to expand the sleeve plastically into cold welding relation with said internal surface, wherein the dimensions of the filament are small in relation to the diameter of the sleeve such that the shock wave has a substantially spherical wave front, the filament occupying a volume whose maximum dimension is not more than about one-eighth the internal diameter of the sleeve.

5. A method according to claim 4, wherein the wall thickness of the sleeve tapers symmetrically towards its respective ends.

6. A method according to claim 4, wherein the interior surface of the sleeve is ellipsoidal.

7. A method according to claim 6, wherein the exterior surface of the sleeve is spherical.

8. A method according to claim 4, wherein the energy transfer medium is a non-explosive liquid normally present in the pipe.

9. A method according to claim 4, wherein the energy transfer medium is a non-explosive water-soluble solid or gel.

10. A method according to claim 4, wherein the sleeve is of aluminum and has a configuration such that the angle of impact of each point of said exterior surface with said internal surface of the pipe lies between 2° and 7°.

11. A method according to claim 4, wherein the sleeve and the filament are positioned at said predetermined location by first advancing them along the pipe in fixed relation to one another to a position at a known distance from said location, and then moving them along the pipe through said known distance to said known location.

12. A device for lining the internal surface of a pipe at a predetermined location therealong, comprising:
a metallic sleeve having interior and exterior surfaces which are coaxial surfaces of revolution, the exterior surface being ellipsoidal and the wall thickness of the sleeve tapering symmetrically towards the respective ends thereof,
a conductive filament positioned concentrically within the sleeve, the conductive filament occupying a volume whose maximum dimension is not more than about one-eighth the internal diameter of the sleeve, means for advancing the sleeve and the conductive filament in predetermined relation to one another along the pipe to said fixed location,
a capacitor positioned externally of the pipe, and
circuit means connecting said capacitor with said filament, said circuit means including a flexible cable and a switch operable to discharge the capacitor through the filament to explode the filament 13. A device according to claim 12, wherein the interior surface of the sleeve is ellipsoidal.

14. A device according to claim 12, wherein the exterior surface of the sleeve is spherical.

15. A device according to claim 12, wherein the sleeve is packed with a water-soluble acoustic energy transfer medium filling the space between the filament and the sleeve.

* * * * *